US009619291B2

(12) United States Patent
Pueyo et al.

(10) Patent No.: US 9,619,291 B2
(45) Date of Patent: Apr. 11, 2017

(54) SYSTEM AND METHOD FOR A TASK MANAGEMENT LIBRARY TO EXECUTE MAP-REDUCE APPLICATIONS IN A MAP-REDUCE FRAMEWORK

(75) Inventors: Lluís Garcia Pueyo, Sant Cugat del Vallès (ES); Roelof van Zwol, Badalona (ES)

(73) Assignee: Yahoo! Inc., Sunnyvale, CA (US)

(*) Notice: Subject to any disclaimer, the term of this patent is extended or adjusted under 35 U.S.C. 154(b) by 1575 days.

(21) Appl. No.: 12/642,849

(22) Filed: Dec. 20, 2009

(65) Prior Publication Data

US 2011/0154341 A1    Jun. 23, 2011

(51) Int. Cl.
*G06F 9/50* (2006.01)

(52) U.S. Cl.
CPC .................................. *G06F 9/5066* (2013.01)

(58) Field of Classification Search
None
See application file for complete search history.

(56) References Cited

U.S. PATENT DOCUMENTS

| | | | |
|---|---|---|---|
| 7,523,123 B2* | 4/2009 | Yang et al. | |
| 8,209,703 B2* | 6/2012 | Yee et al. | 718/106 |
| 2008/0086442 A1* | 4/2008 | Dasdan et al. | 707/1 |
| 2009/0055370 A1* | 2/2009 | Dagum et al. | 707/4 |
| 2009/0158248 A1* | 6/2009 | Linderman et al. | 717/106 |
| 2010/0115046 A1* | 5/2010 | Reddy Byreddy et al. | 709/208 |
| 2010/0241827 A1* | 9/2010 | Yu et al. | 712/30 |
| 2010/0241828 A1* | 9/2010 | Yu et al. | 712/30 |
| 2010/0281078 A1* | 11/2010 | Wang | G06F 17/30445 707/812 |
| 2010/0281166 A1* | 11/2010 | Buyya et al. | 709/226 |
| 2010/0293301 A1* | 11/2010 | Amini et al. | 710/12 |
| 2010/0313205 A1* | 12/2010 | Shao | 718/105 |
| 2011/0029477 A1* | 2/2011 | Tengli et al. | 706/54 |

OTHER PUBLICATIONS

Wei et al., "MR: A Service Integrity Assurance Framework for MapReduce", Sep. 6, 2009, ACSAC 2009.17.*

(Continued)

*Primary Examiner* — Lewis A Bullock, Jr.
*Assistant Examiner* — Kevin X Lu
(74) *Attorney, Agent, or Firm* — Cooper Legal Group, LLC (57) ABSTRACT

An improved system and method for a task management library to execute map-reduce applications is provided. A map-reduce application may be operably coupled to a task manager library and a map-reduce library on a client device. The task manager library may include a wrapper application programming interface that provides application programming interfaces invoked by a wrapper to parse data input values of the map-reduce application. The task manager library may also include a configurator that extracts data and parameters of the map-reduce application from a configuration file to configure the map-reduce application for execution, a scheduler that determines an execution plan based on input and output data dependencies of mappers and reducers, a launcher that iteratively launches the mappers and reducers according to the execution plan, and a task executor that requests the map-reduce library to invoke execution of mappers on mapper servers and reducers on reducer servers.

16 Claims, 6 Drawing Sheets

(56) References Cited

OTHER PUBLICATIONS

Unknown Author, "Cascading version 1.2: A User Guide", Oct. 9, 2008, docs.cascading.org/cascading/1.2/userguide/html/index.html.*
Dean et al., "MapReduce—Simplified Data Processing on Large Clusters," OSDI '04, 6th Symposium on Operating Systems Design and Implementation, 2004.*
Philipp Sumi, "Tracking Inter-Object Dependencies using Expression Trees", www.hardcodet.net/2008/12/observe-dependencies-through-lambda-expressions-part1, Dec. 2008.*

* cited by examiner

SYSTEM AND METHOD FOR A TASK MANAGEMENT LIBRARY TO EXECUTE MAP-REDUCE APPLICATIONS IN A MAP-REDUCE FRAMEWORK

FIELD OF THE INVENTION

The invention relates generally to computer systems, and more particularly to an improved system and method for a task management library to execute map-reduce applications in a map-reduce framework.

BACKGROUND OF THE INVENTION

Cloud computing involves many powerful technologies, including map-reduce applications, that allow large online companies to process vast amounts of data in a short period of time. Tasks such as analyzing traffic, extracting knowledge from social media properties or computing new features for a search index are complex by nature and recur on a regular basis. Map-reduce applications are often used to perform these tasks to process large quantities of data. A map-reduce application may be executed in a map-reduce framework of a distributed computer system where input data is divided and loaded for processing by several mappers, each executing on mapper servers, and partial results from processing by mappers are sent for integration to one or more reducers, each executing on reducer servers. In the domain of research and development, a flexible environment is needed to quickly experiment with different configurations for map-reduce applications.

Unfortunately, usage of these technologies requires a technical expertise that, in many cases, constitutes a barrier to entry. For example, Hadoop is an open source Java implementation of a map-reduce framework with an infrastructure that includes a Hadoop core or map-reduce library to support distributing map-reduce applications over multiple machines. Hadoop has quite a steep learning curve, requiring a developer to become familiar with several technologies within the Hadoop framework such as a data serialization system, a data collection system, a distributed file system, a data warehouse infrastructure, and a high-level data-flow language and execution framework for parallel computation. Additionally, a developer must learn to program data analysis applications in the programming model for processing large data sets including specifying map functions that process an input set of key/value pairs to generate a set of intermediate key/value pairs, and reduce functions that merge intermediate values associated with the same intermediate key into an output set of key/value pairs.

What is needed is a way for a developer to focus on programming data analysis applications in a map-reduce programming model without needing to become familiar with the technical details of several technologies within the Hadoop framework. Such a system and method should allow for easily chaining and parallelizing tasks of a map-reduce application in a map-reduce framework.

SUMMARY OF THE INVENTION

Briefly, the present invention may provide a system and method for a task management library to execute map-reduce applications in a map-reduce framework. In an embodiment of a distributed system, a map-reduce application may be operably coupled to a task manager library and a map-reduce library on a client device, also referred to as a gateway. The map-reduce application may specify mappers configured to process data from an input file by executing on mapper servers and reducers configured to integrate results of processing data from the input file by executing on reducer servers. The map-reduce application may further specify wrappers to parse data input values of the map-reduce application. The map-reduce application may include functionality for invoking the task manager library that interfaces with a map-reduce library to manage the execution of mappers and reducers. The task manager library may include a wrapper application programming interface that provides application programming interfaces invoked by a wrapper to parse data input values of the map-reduce application. The task manager library may also include a configurator that extracts data and parameters of the map-reduce application from a configuration file to configure the map-reduce application for execution, a scheduler that determines an execution plan based on input and output data dependencies of mappers and reducers, a launcher that iteratively launches the mappers and reducers according to the execution plan, and a task executor that requests the map-reduce library to invoke execution of mappers on mapper servers and reducers on reducer servers.

For a task management library to execute map-reduce applications in a map-reduce framework, a configuration file on a client device specifying a map-reduce application for execution may be parsed to extract information, including the names of wrappers, mappers and reducers, to determine task dependencies. In an embodiment, task dependencies of mappers and reducers may be automatically determined. Mappers and reducers without task dependencies blocking execution may first be executed, and then remaining mappers and reducers with task dependencies unblocked by the completion of tasks may next be executed. In various embodiments, mappers and reducers without task dependencies may be executed concurrently. Results of data processing from execution may be integrated and sent to the map-reduce application on the client device.

Advantageously, the task management library of the present invention may provide easy configuration of parameters, specification of map-reduce task settings, automated determination of the number of reducers as needed, and task execution control for easily chaining and parallelizing tasks of a map-reduce application. In addition, the task management library may support file caching to allow the usage of external files in mapper and reducers. Files and folders can be specified, and the task management library will automatically add the contents for a given folder to the cache. As a result, a developer may focus on programming data processing applications in a map-reduce programming model without needing to become familiar with the technical details of several technologies within a map-reduce framework.

Other advantages will become apparent from the following detailed description when taken in conjunction with the drawings, in which:

DETAILED DESCRIPTION

Exemplary Operating Environment

Figure 1:
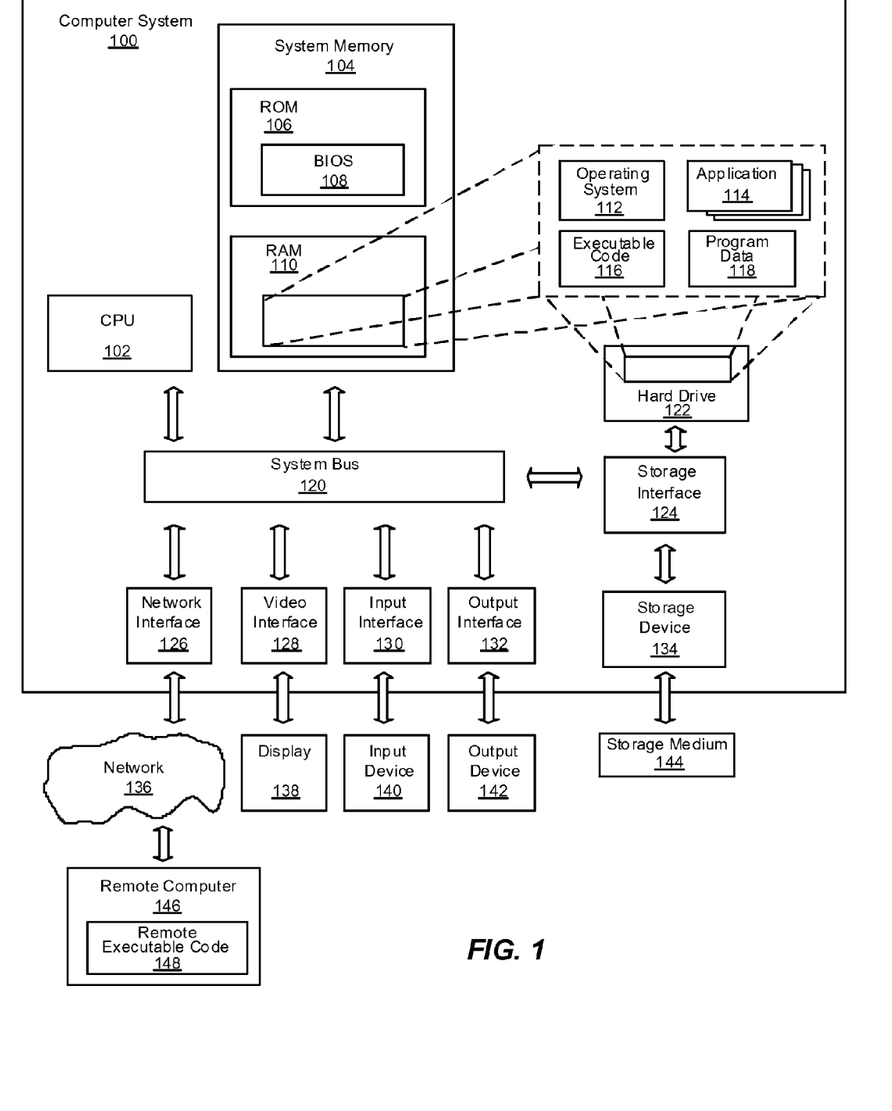
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB).

A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

A Task Management Library to Execute Map-Reduce Applications in a Map-Reduce Framework The present invention is generally directed towards a system and method for a task management library to execute map-reduce applications in a map-reduce framework. A map-reduce framework may support an implementation of a map-reduce application that includes at least one task that may be separated into a map phase and a reduce phase. As used herein, a map-reduce application means an application that includes at least one mapper or at least one reducer configured for execution in a map-reduce system framework. A map-reduce application may be configured with a task manager library and a map-reduce library on a client device. The task manager library may include a wrapper application programming interface that provides application programming interfaces invoked by a wrapper to parse data input values of the map-reduce application. The task manager library may also include a configurator that extracts data and parameters of the map-reduce application from a configuration file to configure the map-reduce application for execution, a scheduler that determines an execution plan based on input and output data dependencies of mappers and reducers, a launcher that iteratively launches the mappers and reducers according to the execution plan, and a task executor that requests the map-reduce library to invoke execution of mappers and reducers.

As will be seen, a configuration file on a client device specifying a map-reduce application for execution may be parsed to extract information, including the names of wrappers, mappers and reducers, to determine task dependencies. Tasks may be executed sequentially where there are task dependencies and concurrently where there are no task dependencies. As will be understood, the various block diagrams, flow charts and scenarios described herein are only examples, and there are many other scenarios to which the present invention will apply.

Figure 2:
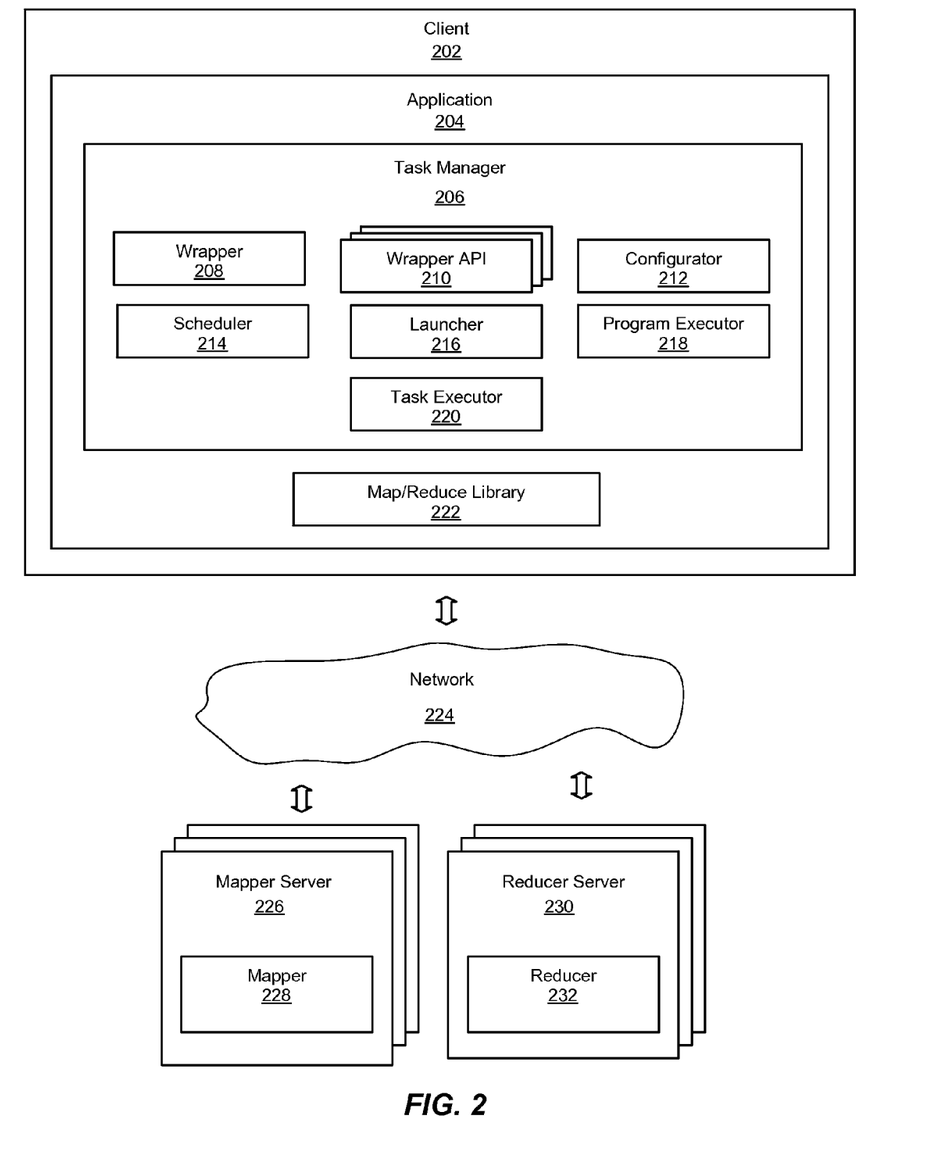
FIG. 2 is a block diagram generally representing an exemplary architecture of system components for a task management library to execute map-reduce applications in a map-reduce framework, in accordance with an aspect of the present invention.

Turning to FIG. 2 of the drawings, there is shown a block diagram generally representing an exemplary architecture of system components for a task management library to execute map-reduce applications in a map-reduce framework. Those skilled in the art will appreciate that the functionality implemented within the blocks illustrated in the diagram may be implemented as separate components or the functionality of several or all of the blocks may be implemented within a single component. For example, the functionality for the program executor 218 may be included as a component of the task executor 220. Or the functionality of the program executor 218 may be implemented as a separate component. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more mapper servers 226 and to one or more reducer servers 230 by a network 224. In other embodiments, one or more mappers and/or one or more reducers may execute on the same server. The client computer 202 may be a computer such as computer system 100 of FIG. 1. The network 224 may be any type of network such as a local area network (LAN), a wide area network (WAN), or other type of network. A map-reduce application 204 may execute on the client computer 202 and may be operably coupled to a task manager library 206 and a map-reduce library 222. The map-reduce application 204 may include functionality for invoking the task manager library 206 that interfaces with a map-reduce library 222 to manage the execution of executable code for mappers and reducers.

The task manager library 206 may include executable code of a wrapper 208 that parses data input values and a wrapper API 210 that provides application programming interfaces invoked by the wrapper 208. The task manager library 206 may also include a configurator 212 that extracts data and parameters of map-reduce application from a configuration file. The task manager library 206 may also include a scheduler 214 that receives a list of tasks and properties of tasks, and returns an execution plan based on input and output data dependencies. The task manager 206 may further include a launcher 216 that iteratively launches tasks according to the execution plan based on input and output data dependencies. The task manager library 206 may also include a program executor 218 that may execute external programs and a task executor 220 that may execute executable code of a mapper or a reducer.

Each of these components may be any type of executable software code that may execute on a computer such as computer system 100 of FIG. 1, including a kernel component, an application program, a linked library, an object with methods, or other type of executable software code. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

The map-reduce library 222 may be a map-reduce library such as Apache Hadoop Core provided by the Apache Software Foundation for running map-reduce applications on mapper servers and reducer servers. In general, a map-reduce application may have a map stage, where part of the input data distributed across mapper servers may be loaded and processed by executable code of a mapper to produce partial results, and a reduce stage, where one or more reducer servers receive and integrate the partial results of data distributed and processed by executable code of mappers to produce final results of data processing by the map-reduce application.

In various embodiments, one or more mapper servers 226 may be operably coupled to one or more reducer servers 230 by network 224. The mapper server 226 and the reducer server 230 may each be a computer such as computer system 100 of FIG. 1. The mapper server 202 may include a mapper 228 that has functionality for processing a part of the input data distributed across mapper servers 202 and sending partial results from processing to a reducer server 230 for integration to produce final results for output. The reducer server 230 may include a reducer 232 that has functionality for receiving partial results of processing parts of the input data from one or more mappers 228, and outputting final results of data processing by the map-reduce application. Each mapper and each reducer may be any type of executable software code, including a kernel component, an application program, a linked library, an object with methods, or other type of executable software code. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

Users rarely run a single task in a map-reduce application for a data processing project and need to chain data processes, transforming the data, retrieving results and reusing obtained results. Multiple tasks can be specified in a configuration file, and the task management library will execute them all, one after the other, allowing for the usage of the results of one task as input for the next one. Additionally, a task can be specified to be executed concurrently with other tasks in the configuration file, where the data the task uses does not depend on any task which has not yet finished execution. In order for the task manager library to manage chaining and parallelizing execution of tasks of a map-reduce application in a map-reduce framework, tasks and parameters of the map-reduce application need to be specified in the configuration file. For instance, mapper, reducer and wrapper executable code referenced by their qualified name may be specified in the configuration file. A set of pathnames of input files or folder can be specified for input data of a single task. And a pathname of an output file or folder can be specified for output of a single task. Once these parameters are defined, a developer can execute the map-reduce application without further need to implement a launcher that may read arguments and initialize the task objects.

Figure 3:
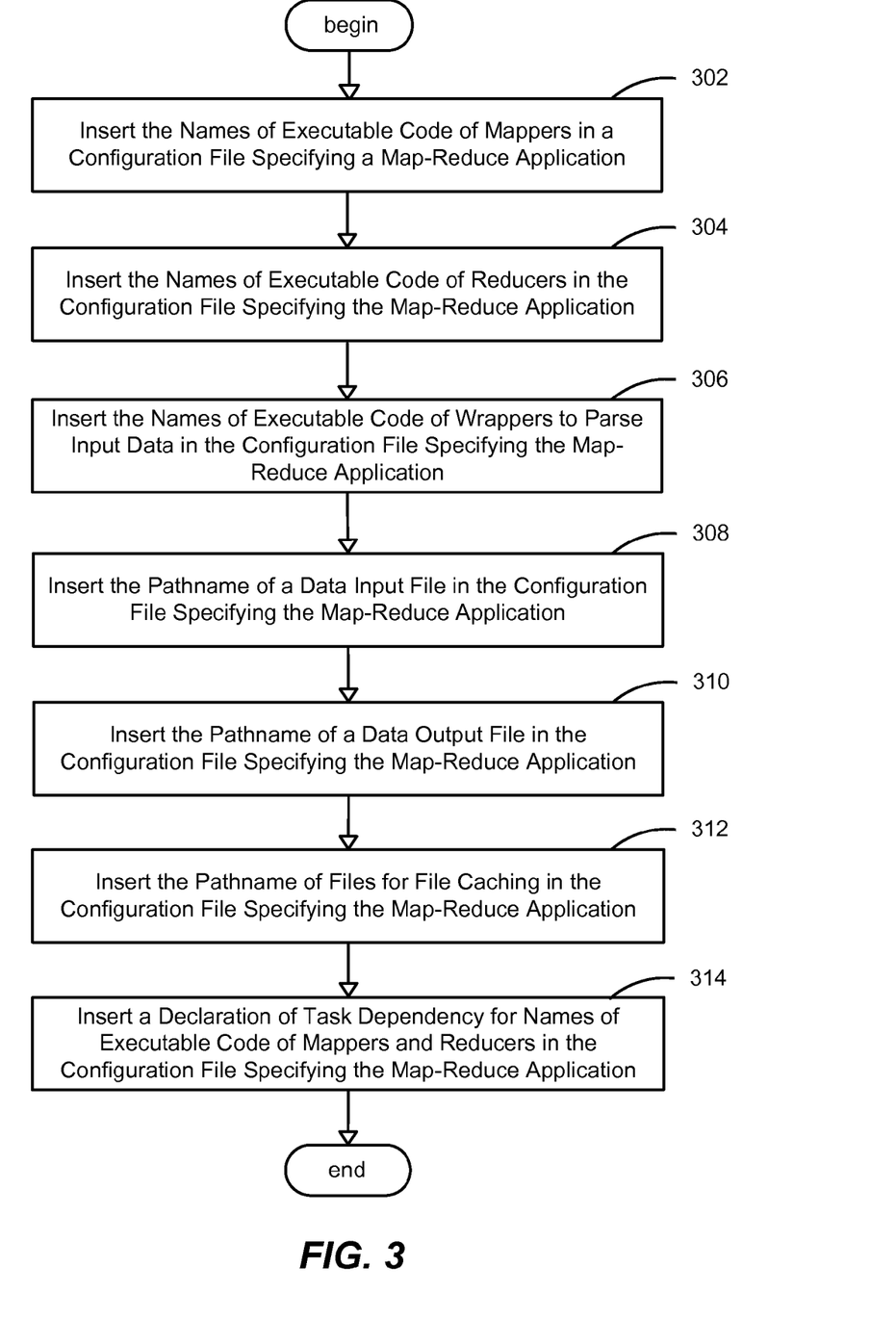
FIG. 3 is a flowchart for generally representing the steps undertaken in one embodiment for generating a configuration file on a client device specifying a map-reduce application for execution in a map-reduce framework, in accordance with an aspect of the present invention.

FIG. 3 presents a flowchart for generally representing the steps undertaken in one embodiment for generating a configuration file on a client device specifying a map-reduce application for execution in a map-reduce framework. In general, a map-reduce application may be configured with a configuration file formatted in Extensible Markup Language (XML) that includes tasks specified by name. Multiple tasks can be specified in a single configuration file, and each task can have multiple parameters defined to change its behavior. At step 302, the names of executable code of mappers may be inserted in a configuration file specifying a map-reduce application. For example, mapper="com.yahoo.cs.IDFMapper" may represent the qualified name of executable code of a mapper that may be inserted into the configuration file specifying a particular task. At step 304, the names of executable code of reducers may be inserted in a configuration file specifying a map-reduce application. Reducer="com.yahoo.cs.IDFReducer", for example, may represent the qualified name of executable code of a reducer that may be inserted into the configuration file specifying a particular task.

At step 306, the names of executable code of wrappers to parse input data may be inserted in a configuration file specifying a map-reduce application. For example, wrapper="com.yahoo.cs.DocumentsWrapper" may represent the qualified name of executable code of a mapper that may be inserted into the configuration file specifying a particular task. Small differences in the data format often imply replication of mappers and reducers with modifications such as changing a constant value, for example, or duplicating functions. A wrapper may create a <key; value> pair for a given input value. Thus, an existing mapper and reducer may be reused to solve a common task without changing the mapper and reducer to different types of input data. Instead, a different Wrapper may be implemented for different kinds of input data. Wrappers may be implemented in an embodiment through an extendable IWrapper interface, with the signatures:

```
public Writable wrap ( Writable obj );
public Writable key ( Writable obj );
public void setConfiguration
  ( Hashtable<String, String> confTable );
```

Independent of the data input format, one of the simplest structures for a mapper would be:

```
public void map( ... )
{
Writable wrappedfivalue = wrapper.wrap( value );
Writable wrappedfikey = wrapper.key( value );
(...)
output.collect(
( Text ) wrappedfikey,
( Text ) wrappedfivalue
);
}
```

At step 308, the pathname of a data input file may be inserted in a configuration file specifying a map-reduce application. For example, input path="documents.dat" may represent the pathname of an input file that may be inserted into the configuration file specifying a particular task. Multiple input files may be inserted in the configuration file specifying a particular task. At step 310, the pathname of a data output file may be inserted in a configuration file specifying a map-reduce application. Output delete="1" path="outputIDF", for example, may represent the pathname of an output file that may be inserted into the configuration file specifying a particular task.

Furthermore, the pathnames of files for file caching may be inserted in a configuration file specifying a map-reduce application at step 312. File caching allows for the usage of external files by mapper and reducer classes, and the pathnames of files for caching may be inserted into the configuration file specifying a particular task. For example, cache path="/user/lluis/otherresults.dat" may represent the specification of a pathname of a file for caching that may be inserted into the configuration file specifying a particular task. Multiple specification of files for caching may be inserted in the configuration file specifying a particular task.

At step 314, declarations of task dependency for the names of executable code of mappers and reducers may be inserted in a configuration file specifying a map-reduce application. Task dependencies may be specified by the "dependsOn" declaration in a configuration file. For example, task id="MatchTFs" dependsOn="TFDocuments, TFQueries" may represent the specification of task dependencies of a task that may be inserted into the configuration file specifying a particular task. The task management library may use the declarations of task dependency to plan the order of execution of mappers and reducers, waiting for results and launching new tasks. In an embodiment, the task management library may execute tasks without dependencies concurrently, wait for their completion of execution, and start the dependent tasks afterwards. Note that the "dependsOn" declaration may also be used to specify a task without a dependency in a configuration file which may be indicated, for example, by setting the dependency of a task to the null string, such as the declaration, task id="IDF" dependsOn=" ". In various embodiments where the task management library automatically determines dependency of tasks without the "dependsOn" declaration, the "dependsOn" declaration may be used to enforce consecutive execution of tasks. Those skilled in the art will appreciate that other parameters can be specified in a configuration file such as a task ID for tracking the execution progress of a task. In addition, a task ID may also be used for dependency references or other options.

Figure 4:
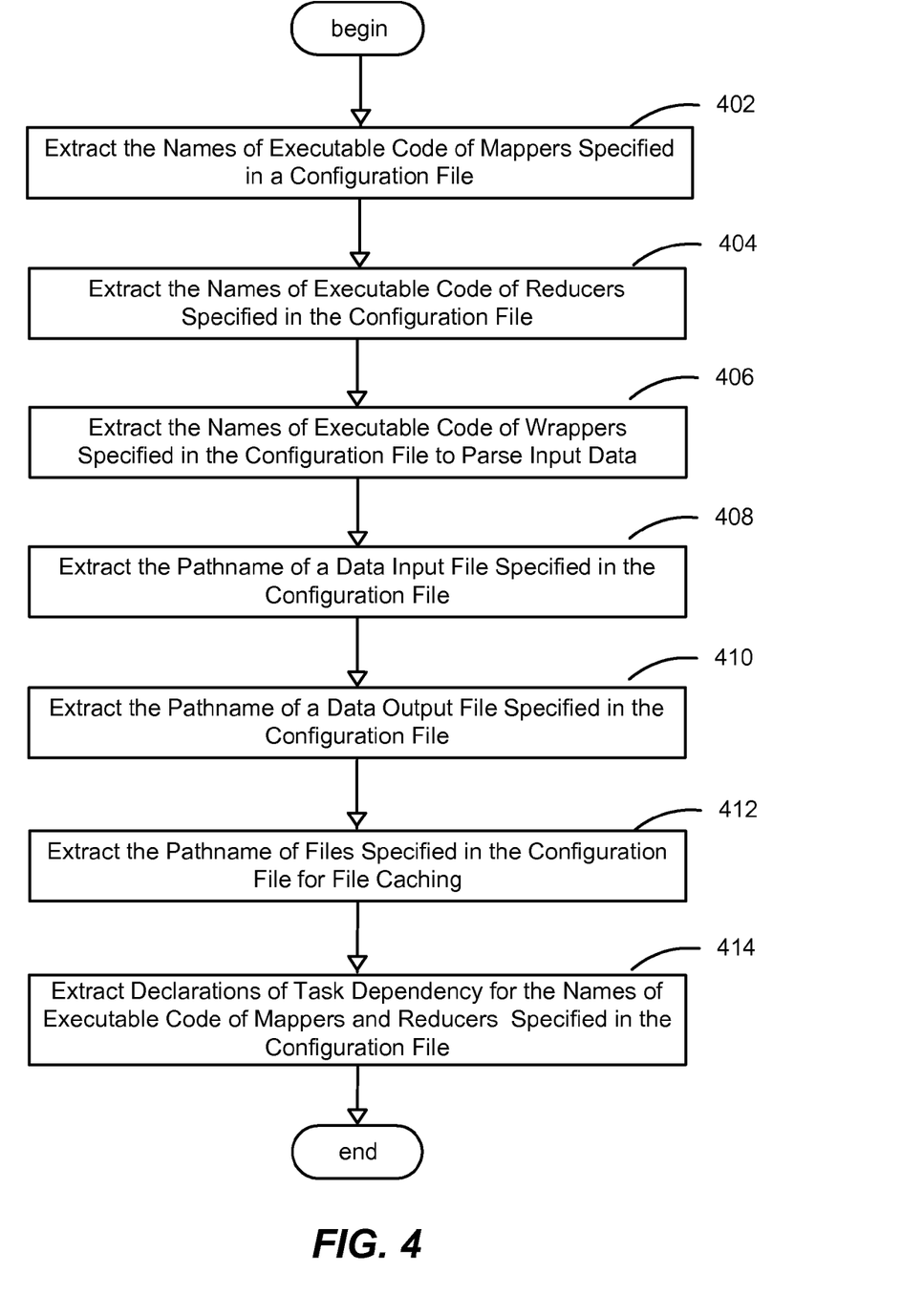
FIG. 4 is a flowchart for generally representing the steps undertaken in one embodiment for parsing a configuration file on a client device specifying a map-reduce application for execution in a map-reduce framework, in accordance with an aspect of the present invention.

FIG. 4 presents a flowchart for generally representing the steps undertaken in one embodiment for parsing a configuration file on a client device specifying a map-reduce application for execution in a map-reduce framework. At step 402, the names of executable code of mappers may be extracted from a configuration file specifying a map-reduce application. For example, mapper="com.yahoo.cs.IDFMapper" may represent the qualified name of executable code of a mapper that may be extracted from the configuration file specifying a particular task. At step 404, the names of executable code of reducers may be extracted from a configuration file specifying a map-reduce application. Reducer="com.yahoo.cs.IDFReducer", for example, may represent the qualified name of executable code of a reducer that may be extracted from the configuration file specifying a particular task. At step 406, the names of executable code of wrappers to parse input data may be extracted from a configuration file specifying a map-reduce application. Wrapper="com.yahoo.cs.DocumentsWrapper", for example, may represent the qualified name of executable code of a mapper that may be extracted from the configuration file specifying a particular task.

At step 408, the pathname of a data input file may be extracted from a configuration file specifying a map-reduce application. For example, input path="documents.dat" may represent the pathname of an input file that may be extracted from the configuration file specifying a particular task. At step 410, the pathname of a data output file may be extracted from a configuration file specifying a map-reduce application. Output delete="1" path="outputIDF", for example, may represent the pathname of an output file that may be extracted from the configuration file specifying a particular task.

At step 412, the pathnames of files for file caching may be extracted from a configuration file specifying a map-reduce application. Cache path="/user/lluis/otherresults.dat", for example, may represent the specification of a pathname of a file for caching that may be extracted from the configuration file specifying a particular task. And declarations of task dependency for the names of executable code of mappers and reducers may be extracted at step 414 from a configuration file specifying a map-reduce application. For example, task id="MatchTFs" dependsOn="TFDocuments, TFQueries" may represent the specification of task dependencies of a task that may be extracted from the configuration file specifying a particular task. Those skilled in the art will appreciate that other parameters can be extracted from the configuration file such as a task ID for tracking the execution progress of a task.

Figure 5:
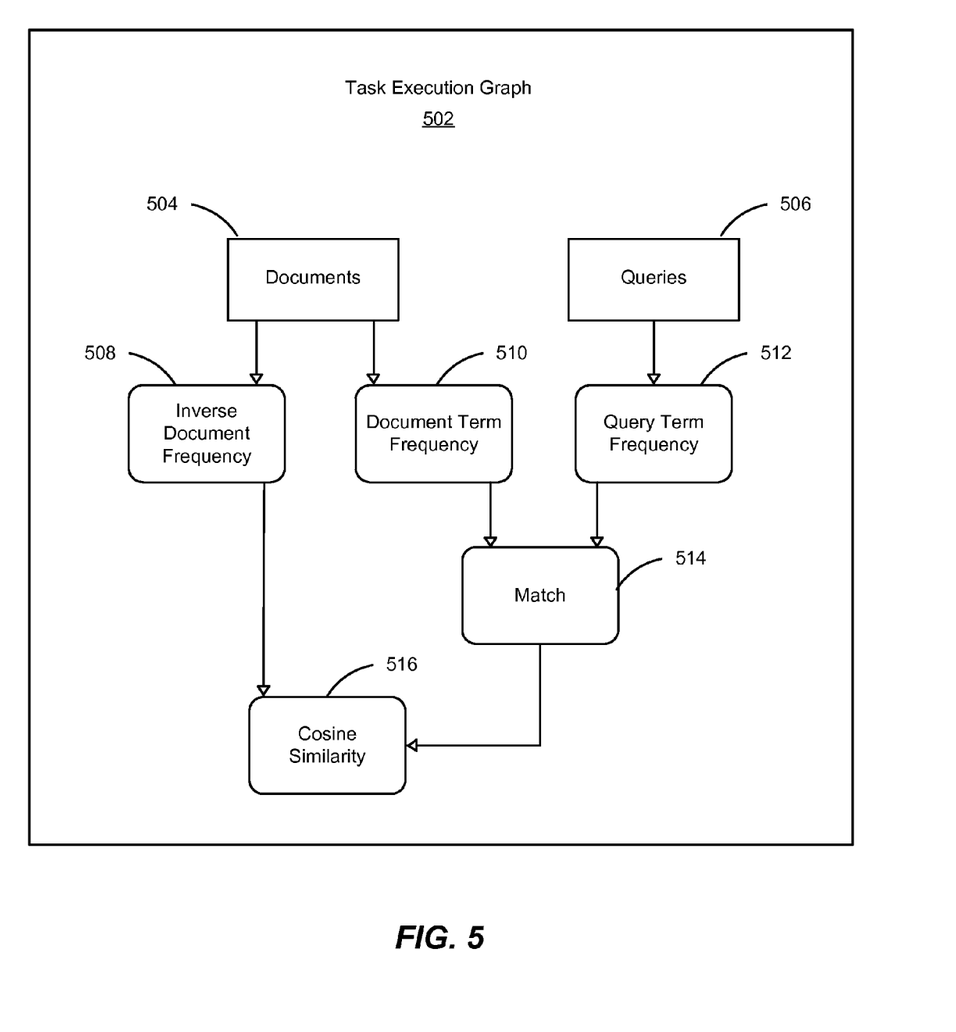
FIG. 5 is an illustration depicting in an embodiment a task execution graph with dependent tasks blocked for execution until other tasks complete execution, in accordance with an aspect of the present invention.

FIG. 5 depicts in an embodiment a task execution graph illustrating dependent tasks blocked for execution until other tasks complete execution and tasks without a dependency upon other tasks that block execution. In the embodiment of the task execution graph 502 illustrated in FIG. 5, for example, documents 504 may be input data to a process to calculate the inverse document frequency 508 and to a process to calculate the document term frequency (TF) 510. The task to calculate the inverse document frequency 508 may be specified in a configuration file as follows:

```
<task id="IDF" dependsOn=""
mapper="com.yahoo.cs.IDFMapper"
reducer="com.yahoo.cs.IDFReducer"
wrapper="com.yahoo.cs.DocumentsWrapper">
<input path="documents.dat" />
<input path="documents/*" />
<output delete="1" path="outputIDF" />
<arg name="NUMfiDOCUMENTS" value="2766679" />
<reducers min="50" />
</task>.
```

An IDFMapper, an IDFReducer, a DocumentsWrapper, input and output pathnames are specified for the task. In addition to declaring that the task to calculate inverse document frequency does not have any task dependencies, the number of reducers required is declared to be a minimum of 50. And the task to calculate the document term frequency 510 may be specified in a configuration file as follows:

```
<task id="TFDocuments" dependsOn=""
mapper="com.yahoo.cs.TFMapper"
reducer="com.yahoo.cs.TFReducer"
wrapper="com.yahoo.cs.DocumentsWrapper">
<input path="documents.dat" />
<input path="documents/*" />
<output delete="1" path="outputTF" />
</task>.
```

A TFMapper, a TFReducer, a DocumentsWrapper, input and output pathnames are specified for the task. In addition, the task to calculate the document term frequency does not have any task dependencies.

The queries 506 may be input data to a process to calculate the query term frequency 512. The task to calculate the query term frequency 512 may be specified in a configuration file as follows:

```
<task id="TFQueries"
mapper="com.yahoo.cs.TFMapper"
reducer="com.yahoo.cs.TFReducer"
wrapper="com.yahoo.cs.QueriesWrapper">
<input path="queries.dat" />
<input path="queries/*" />
<output delete="1" path="outputTFQueries" />
</task>
```

A TFMapper, a TFReducer, a QueriesWrapper, input and output pathnames are specified for the task. Note that the mapper and reducer used for calculating the document term frequency may be also used to calculate the query term frequency, but there is a different wrapper specified for parsing an input file of queries. In addition, the task to calculate the query term frequency does not have any task dependencies.

The results of calculating the document term frequency 510 and the query term frequency 512 are input to a process to match term frequencies 514 from document term frequency 510 and query term frequency 512. The task to match term frequencies 514 may be specified in a configuration file as follows:

```
<task id="MatchTFs" dependsOn="TFDocuments,TFQueries"
mapper="com.yahoo.cs.MatchTFMapper"
reducer="com.yahoo.cs.MatchTFReducer"
wrapper="com.yahoo.cs.QueryDocumentsWrapper">
<input path="outputTF/*" />
<input path="outputTFQueries/*" />
<output delete="1" path="outputMatchTF" />
</task>
```

A MatchTFMapper, a MatchTFReducer, a QueriesDocumentsWrapper, input and output pathnames are specified for the task. In addition, the task to match term frequencies has two task dependencies, TFDocuments and TFQueries. Before the task to match term frequencies may execute, the task to calculate the document term frequency and the task to calculate the query term frequency must complete execution.

The output of the inverse document frequency 508 and the output of matched term frequencies 514 are input to calculating the cosine similarity distance 516 between the inverse document frequency and the matched term frequencies. The task to calculate the cosine similarity distance 516 between the inverse document frequency and the matched term frequencies may be specified in a configuration file as follows:

```
<task id="CosineSimilarity" dependsOn="MatchTFs, IDF"
mapper="com.yahoo.cs.csMapper"
reducer="com.yahoo.cs.csReducer"
wrapper="com.yahoo.cs.csWrapper">
<input path="outputMatchTF/*" />
<input path="outputIDF/*" />
<output delete="1" path="outputcs" />
</task>
```

A csMapper, a csReducer, a csWrapper, input and output pathnames are specified for the task. In addition, the task to calculate the cosine similarity distance has two task dependencies, MatchTFs and IDF. Before the task to calculate the cosine similarity distance may execute, the task to match term frequencies and the task to calculate the inverse document frequency must complete execution. As illustrated by FIG. 5, a map-reduce application may have many tasks that are part of a bigger application where some of the tasks use the results obtained from execution of previous tasks.

Figure 6:
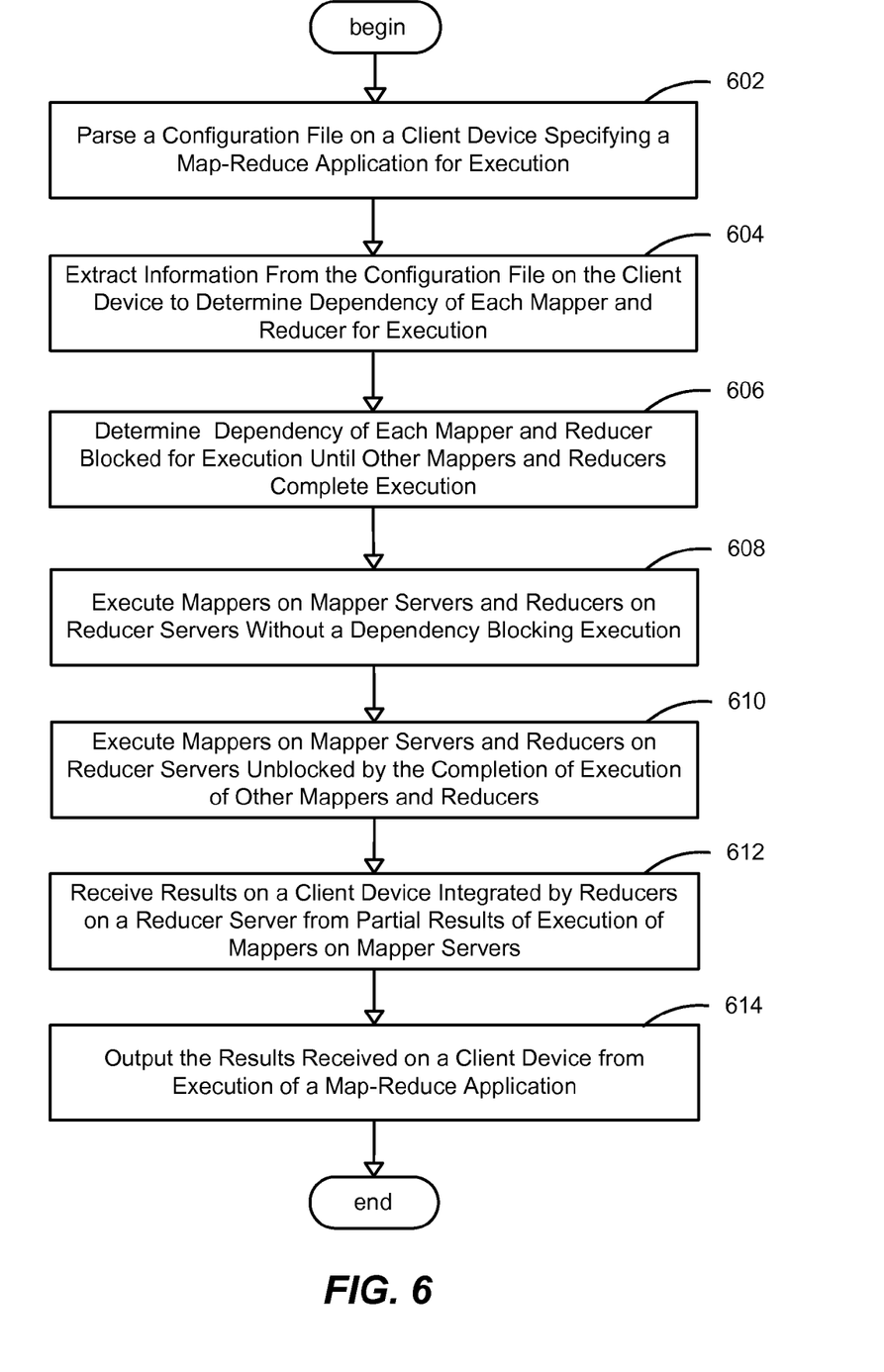
FIG. 6 is a flowchart for generally representing the steps undertaken in one embodiment for executing in a map-reduce framework a map-reduce application specified in a configuration file, in accordance with an aspect of the present invention.

FIG. 6 presents a flowchart for generally representing the steps undertaken in one embodiment for executing in a map-reduce framework a map-reduce application specified in a configuration file. At step 602, a configuration file on a client device specifying a map-reduce application for execution in a map-reduce framework may be parsed. In an embodiment, the configuration file may be parsed as described above in conjunction with FIG. 4. At step 604, information may be extracted from the configuration file on the client device to determine task dependency of each mapper and reducer upon other mappers and reducers for execution. For example, declarations of task dependency for the names of executable code of mappers and reducers may be extracted from a configuration file specifying a map-reduce application.

At step 606, task dependency may be determined for each mapper and reducer blocked for execution until other mappers and reducers complete execution. In an embodiment, a scheduler in the task management library may determine task dependency and generate an execution plan that specifies the order of execution of tasks including mappers and reducers. In an embodiment, any order of execution may be specified for mappers and reducers without a dependency blocking execution. At step 608, mappers on mapper servers and reducers on reducer servers without a dependency blocking execution may be executed. In an embodiment, unblocked mappers and reducers may be executed in any order. At step 610, mappers on mapper servers and reducers on reducer servers unblocked by the completion of execution of other mappers and reducers may be executed. In an embodiment, unblocked mappers and reducers may be executed in any order.

At step 612, results integrated by reducers on reducer servers from partial results of execution of mappers on mapper servers may be received on a client device. In an embodiment, one or more reducers may integrate the partial results of execution of mappers. And results received on a client device from execution of a map-reduce application may be output at step 614.

Other parameters of a map-reduce application may also be specified in a configuration file and extracted from the configuration file that support a developer programming data processing applications in a map-reduce programming model. For instance, task parameters such as job format may be specified in a configuration file as follows:

```
<jobformat
input="org.apache.hadoop.mapred.TextOutputFormat"
output="com.yahoo.hadooputils.CSOutputFormat" />
<joboutput
key="org.apache.hadoop.io.Text"
value="com.yahoo.hadooputils.CSElement" />
<!-- Compress the output -->
<jobparam
name="mapred.output.compress"
value="true" />
<jobparam
name="mapred.output.compression.codec"
value="org.apache.hadoop.io.compress.GzipCodec" />.
```

As another example, the task management library may also support passing of defined parameters such as a range of values to a task for repeated execution of the same task or sequence of tasks with different data sets. For instance, loop iteration variables may be defined to control executing a task with different arguments without needing to recompile the map-reduce application or tasks. A task may be specified in a configuration file to pass parameters for repeated execution of the task as follows:

```
< var name="N" value="10" />
<loop
    id="loopid"
    loopvar="counter"
    from="0" to="$N" inc="+1"
    mapper="com.yahoo.cs.LoopMapper"
```

```
            reducer="com.yahoo.cs.LoopReducer"
            wrapper="com.yahoo.cs.CounterWrapper">
            parallel="1" dependsOn="loop0">
            <input path="loop/$counter" />
            <output delete="1" path="output/$counter" />
        <arg name="iteration" value="$counter" />
        </loop>.
```

On every iteration during execution, the $counter variable value will be incremented by one as this task is repeatedly executed 11 times (from 0 to 10).

Thus, the task management library of the present invention may provide easy configuration of parameters, specification of map-reduce task settings, automated determination of the number of reducers as needed, and task execution control for easily chaining and parallelizing tasks of a map-reduce application. The flexible environment provided by the task management library allows a developer to focus on programming data analysis applications in the programming model of a map-reduce framework and to quickly experiment with different configurations for map-reduce applications.

As can be seen from the foregoing detailed description, the present invention provides an improved system and method for a task management library to execute map-reduce applications. A map-reduce application may be configured with a task manager library and a map-reduce library on a client device. The task manager library may include a wrapper application programming interface that provides application programming interfaces invoked by a wrapper to parse data input values of the map-reduce application. The task manager library may also include a configurator that extracts data and parameters of the map-reduce application from a configuration file to configure the map-reduce application for execution, a scheduler that determines an execution plan based on input and output data dependencies of mappers and reducers, a launcher that iteratively launches the mappers and reducers according to the execution plan, and a task executor that requests the map-reduce library to invoke execution of mappers on mapper servers and reducers on reducer servers. Such a system and method may provide a layer on top of a map-reduce library that abstracts technical details of a map-reduce library for a developer while harnessing the computation facilities offered by the programming model in a map-reduce framework. As a result, the system and method provide significant advantages and benefits needed in contemporary computing and in large scale applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for executing a map-reduce application, comprising:
a map-reduce framework comprising:
    at least one mapper server;
    at least one reducer server; and
a client device comprising:
    a configuration file specifying a map-reduce application for execution;
    the map-reduce application comprising tasks that can be separated into map phase tasks executed by a mapper on the at least one mapper server and reduce phase tasks executed by a reducer on the at least one reducer server; and
    a task management library providing configuration of parameters, specification of map-reduce task settings, automated determination of a number of reducers, and task execution control for chaining and parallelizing the tasks by:
        parsing the configuration file, the configuration file specifying one or more task dependencies of one or more tasks associated with one or more mappers and one or more reducers, the configuration file specifying a first wrapper used for a first type of input data and a second wrapper used for a second type of input data, the first wrapper different than the second wrapper, the first type of input data different than the second type of input data;
        extracting information from the parsed configuration file;
        determining an execution plan, associated with an order of execution of the one or more mappers and the one or more reducers, based on the one or more task dependencies and at least one of the first wrapper or the second wrapper, the determining performed using the extracted information;
        invoking execution of the one or more mappers on the at least one mapper server according to the execution plan;
        invoking execution of the one or more reducers on the at least one reducer server according to the execution plan; and
        providing final results to the map-reduce application based upon the execution plan.

2. The computer system of claim 1 wherein the one or more tasks comprise a first task and a second task, the first task specified by the configuration file to be associated with a first mapper, a first reducer, and the first wrapper, the second task specified by the configuration file to be associated with a second mapper, a second reducer, and the second wrapper.

3. The computer system of claim 1 wherein the configuration file is different than the execution plan.

4. The computer system of claim 1 wherein the task management library implements the task execution control by:
    invoking sequential task execution and concurrent task execution based on the one or more task dependencies.

5. The computer system of claim 1 wherein the task management library invokes the execution of the one or more mappers and the one or more reducers by:
    first invoking execution of mapper tasks and reducer tasks without task dependencies blocking execution; and
    then invoking execution of remaining mapper tasks and reducer tasks with task dependencies unblocked by the completion of tasks.

6. The computer system of claim 1 wherein the at least one reducer server is operably coupled with the at least one mapper server through a network.

7. The computer system of claim 1 comprising a scheduler that facilitates determining the execution plan.

8. The computer system of claim 1 comprising a launcher that iteratively launches the one or more mappers and the one or more reducers according to the execution plan.

9. A method for executing a map-reduce application, said method comprising:
- accessing a configuration file specifying a map-reduce application for execution, said map-reduce application comprising tasks that can be separated into map phase tasks executed by a mapper on an at least one mapper server and reduce phase tasks executed by a reducer on an at least one reducer server;
- parsing the configuration file, the configuration file specifying one or more task dependencies of one or more tasks associated with one or more mappers and one or more reducers, the configuration file specifying a first wrapper used for a first type of input data and a second wrapper used for a second type of input data, the first wrapper different than the second wrapper, the first type of input data different than the second type of input data;
- extracting information from the parsed configuration file;
- determining an execution plan, associated with an order of execution of the one or more mappers and the one or more reducers, based on the one or more task dependencies and at least one of the first wrapper or the second wrapper, the determining performed using the extracted information;
- invoking execution of the one or more mappers on the at least one mapper server according to the execution plan;
- invoking execution of the one or more reducers on the at least one reducer server according to the execution plan; and
- providing final results to the map-reduce application based upon the execution plan.

10. The method of claim 9 wherein extracting the information comprises extracting names of wrappers, mapper servers, and reducer servers.

11. The method of claim 9 wherein the configuration file is different than the execution plan.

12. The method of claim 9 comprising invoking sequential task execution and concurrent task execution based on the one or more task dependencies.

13. The method of claim 9 comprising:
- first invoking execution of mapper tasks and reducer tasks without task dependencies blocking execution; and
- then invoking execution of remaining mapper tasks and reducer tasks with task dependencies unblocked by the completion of tasks.

14. The method of claim 9 comprising integrating results using the reducer.

15. The method of claim 9 comprising iteratively launching the one or more mappers and the one or more reducers according to the execution plan.

16. A non-transitory computer readable storage medium with computer-executable instructions stored thereon, said computer-executable instructions when executed facilitating operations comprising:
- accessing a configuration file specifying a map-reduce application for execution;
- parsing the configuration file, the configuration file specifying one or more task dependencies of one or more tasks associated with one or more mappers and one or more reducers, the configuration file specifying a first wrapper used for a first type of input data and a second wrapper used for a second type of input data, the first wrapper different than the second wrapper, the first type of input data different than the second type of input data;
- extracting information from the parsed configuration file;
- determining an execution plan, associated with an order of execution of the one or more mappers and the one or more reducers, based on the one or more task dependencies and at least one of the first wrapper or the second wrapper, the determining performed using the extracted information;
- invoking execution of the one or more mappers on at least one mapper server according to the execution plan; and
- invoking execution of the one or more reducers on at least one reducer server according to the execution plan.

* * * * *